(12) United States Patent
McDonough

(10) Patent No.: US 6,697,470 B2
(45) Date of Patent: Feb. 24, 2004

(54) INCOMING CALL INDICATOR

(76) Inventor: Steven D. McDonough, 2800 Elizabeth Ave., Zion, IL (US) 60099

( * ) Notice: Subject to any disclaimer, the term of this patent is extended or adjusted under 35 U.S.C. 154(b) by 358 days.

(21) Appl. No.: 09/819,362

(22) Filed: Mar. 28, 2001

(65) Prior Publication Data

US 2002/0141554 A1 Oct. 3, 2002

(51) Int. Cl.[7] ............. H04M 1/56; H04M 1/00
(52) U.S. Cl. ............. 379/142.01; 379/142.06; 379/142.17; 379/207.16; 379/70; 379/87; 379/88.21; 379/373.01; 379/373.02; 379/373.04; 379/374.02
(58) Field of Search .............. 379/142.01, 142.04, 379/142.06, 142.12, 142.13, 142.15, 142.17, 188, 196, 199, 200, 201.01, 207.02, 207.1, 207.13, 207.15, 207.16, 213.01, 214.01, 70, 76, 77, 79, 80, 82, 88.12, 88.18, 88.2, 88.21, 88.23, 88.24, 372, 373.01, 373.03, 373.04, 374.02

(56) References Cited

U.S. PATENT DOCUMENTS

| | | |
|---|---|---|
| 4,194,089 A | 3/1980 | Hashimoto |
| 4,230,909 A | 10/1980 | Baum |
| 4,515,995 A | 5/1985 | Bolick, Jr. et al. |
| 4,518,827 A | 5/1985 | Sagara |
| 4,571,458 A | 2/1986 | Bond |
| 4,856,055 A | 8/1989 | Schwartz |
| 4,985,913 A | 1/1991 | Shalom et al. |
| 5,007,076 A * | 4/1991 | Blakley ............... 379/67.1 |
| 5,276,731 A | 1/1994 | Arbel et al. |
| 5,307,059 A | 4/1994 | Connary et al. |
| 5,388,150 A | 2/1995 | Schneyer et al. |
| 5,394,445 A * | 2/1995 | Ball et al. ............ 379/67.1 |
| 5,452,354 A * | 9/1995 | Kyronlahti et al. .... 379/373.02 |
| 5,481,599 A | 1/1996 | MacAllister et al. |
| 5,533,102 A * | 7/1996 | Robinson et al. ...... 379/88.25 |
| 5,602,908 A | 2/1997 | Fan |
| 5,687,227 A | 11/1997 | Cohrs et al. |
| 5,715,308 A * | 2/1998 | Shankarappa ......... 379/373.02 |
| 5,727,045 A | 3/1998 | Kim |
| 5,784,444 A * | 7/1998 | Snyder et al. ......... 379/142.01 |
| 5,850,435 A | 12/1998 | Devillier |
| 5,854,826 A | 12/1998 | Kim |
| 5,892,817 A | 4/1999 | Will |
| 5,903,628 A | 5/1999 | Brennan |
| 5,905,786 A * | 5/1999 | Hoopes ............... 379/142.01 |
| 6,002,761 A * | 12/1999 | Sremac ............... 379/373.04 |
| 6,072,859 A | 6/2000 | Kong |
| 6,088,440 A * | 7/2000 | Millar et al. ............ 379/251 |
| 6,449,359 B1 * | 9/2002 | Luzzatto et al. ....... 379/373.01 |
| 6,621,903 B2 * | 9/2003 | Oda ................... 379/374.01 |

* cited by examiner

*Primary Examiner*—Curtis Kuntz
*Assistant Examiner*—Quoc Tran
(74) *Attorney, Agent, or Firm*—Sue Lukasi

(57) ABSTRACT

A method for selecting from a plurality of modes for an incoming call indicator is provided. One of the plurality of modes comprises alternating playing one of a series of user-recorded messages as the incoming call indicator to a called party. When an incoming call is received, the selected mode determines the incoming call indicator.

32 Claims, 4 Drawing Sheets

INCOMING CALL INDICATOR

TECHNICAL FIELD

This invention relates generally to telecommunications, including, but not limited to, provision of incoming call indicators.

BACKGROUND OF THE INVENTION

Conventional telephones provide a ringing sound as an incoming call indicator to a called party when the telephone receives an incoming phone call. Other telephones allow the called party to enter recorded messages that are associated with an incoming phone number and directed to the incoming phone caller. Existing telephones do not provide many options that allow the user to select or provide the incoming call indicator.

DETAILED DESCRIPTION

The following describes a method and apparatus that allows a user to select and/or provide the incoming call indicator for incoming calls directed to the user. Various different modes of incoming call indicators are provided. Provision is made for multiple different incoming call indicators to be recorded by the user. In one mode, incoming call indicators are tailored to the incoming caller's phone number. In another mode, the incoming call indicator is alternated by call or by ring.

A method of the present invention comprises providing at least two recorded messages and based on an alternating criterion, automatically alternating playing the at least two recorded messages as an incoming call indicator to a called party when an incoming call is received by a phone. Optionally, the method may further comprise the step of associating a predetermined message with one or more incoming phone numbers, and when a call is received from one of the one or more incoming phone numbers, substituting the automatically alternating playing step with playing the predetermined message associated with the one of the incoming phone numbers as an incoming call indicator to a called party. The predetermined message is recorded by a user.

Figure 1:
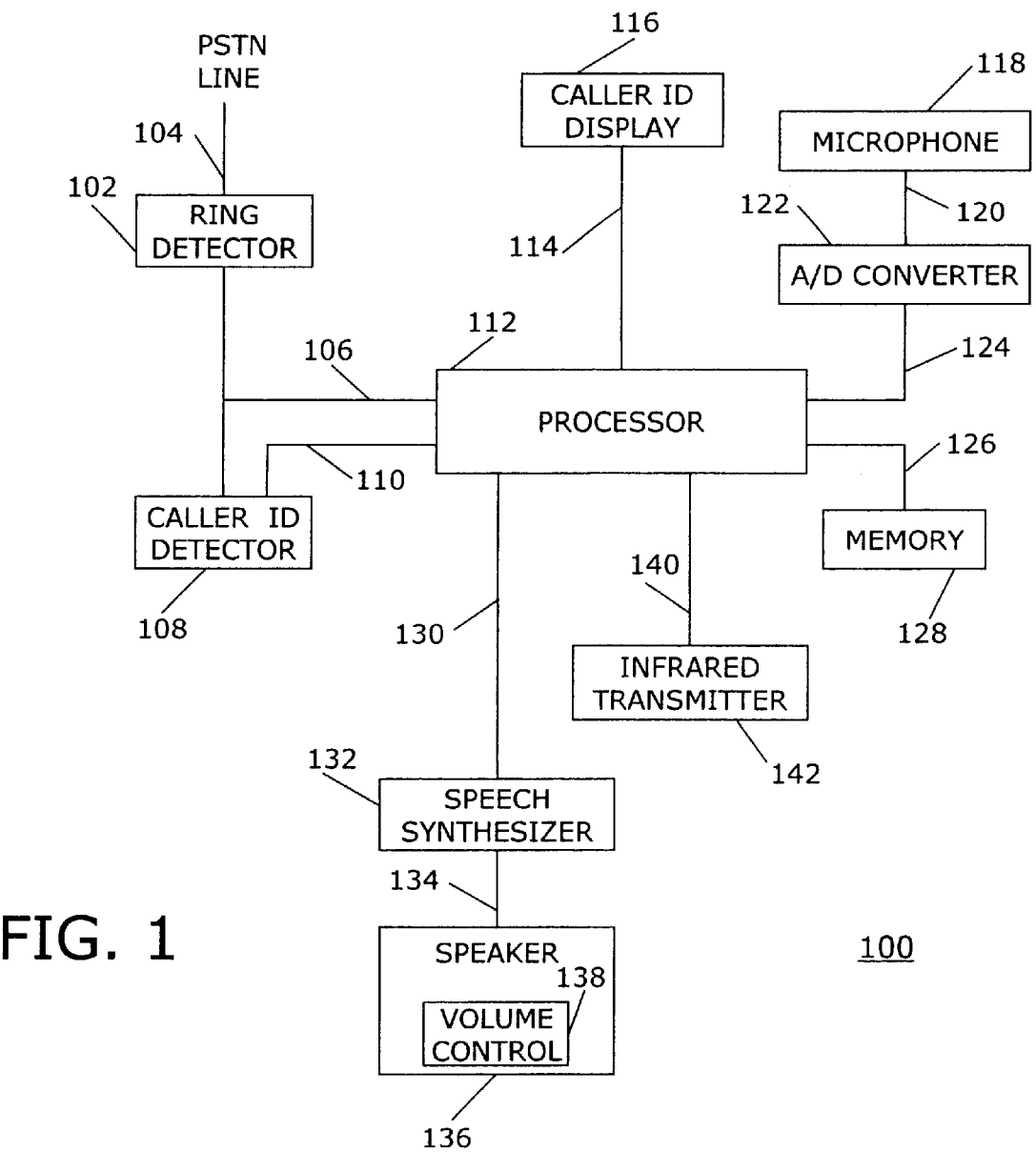
FIG. 1 is a block diagram of a system that provides a user selectable incoming call indicator in accordance with the invention.

Referring to FIG. 1, an example of a system 100 that provides an incoming call indicator to a called party is shown. The system 100 may be located inside a telephonic device or may be an add-on device to an existing telephonic device. The telephonic device may be a wireline or wireless phone. The system 100 has a ring detector 102, as well known in the art, that is activated upon receipt of an incoming phone call 104. For example, the ring detector 102 may be the ring detector disclosed in U.S. Pat. No. 5,481,599, issued Jan. 2, 1996, and titled "Automated Audio Output Device for a Telephone Set" by Donald I. MacAllister et al. The ring signal of the incoming phone call 104 is typically a pulse ring voltage that comes from a central processing center or central switch on the public switched telephone network. The pulse ring voltage enables the system 100 to generate a ring The incoming phone call 104 may originate from a telephonic calling device, such as, for example, a telephone, cellular telephone, or a personal computer. The incoming phone call 104 may contain information associated with the incoming phone call 104, such as a phone number of the caller and may also contain a name of a person or organization associated with the phone number.

When the ring detector 102 receives the incoming phone call 104 including the pulse ring voltage, the ring detector 102 generates a ring detector output signal 106 that indicates that the ring detector 102 has received the incoming phone call 104, as well as any other part of the incoming phone call 104 signal that may be of value to the processor 112. The ring detector 102 relays the ring detector output signal 106 to a processor 112. The processor 112 may be a microprocessor, digital signal processor, or other type of processing device as known in the art. An example of a processor is disclosed in U.S. Pat. No. 5,481,599, issued Jan. 2, 1996, and titled "Automated Audio Output Device for a Telephone Set" by Donald I. MacAllister et al.

The ring detector 102 also relays the ring detector output signal 106 to a caller identification (ID) detector 108, as well known in the art. Based on the information associated with the incoming phone call 104 in the ring detector output signal 106, the caller ID detector 108 determines the phone number of the caller and/or the name of the person or organization that is associated with the phone number.

The caller ID detector 108 generates a caller ID detector output signal 110 that contains relevant information from the incoming phone call 104, such as the phone number of the caller and the name of the person or organization that is associated with the phone number. The caller ID detector 108 relays the caller ID detector output signal 110 to the processor 112.

The processor 112 and generates a processor ID output signal 114 that contains, for example, the information from the caller ID detector output signal 110. The processor 112 relays the processor ID output signal 114 to a caller ID display 116, as known in the art. An example of a caller ID display is disclosed in U.S. Pat. No. 6,072,859, issued on Jun. 6, 2000, and titled "Apparatus and Method of Generating Voice Message of Caller's Number in Case of Incoming Call in Telephone" by Tae-Ho Kong. Based on the information contained in the processor ID output signal 114, the caller ID display 116 displays the phone number of the caller and/or the name of the person or organization that is associated with the phone number. The caller ID display 116 may store caller ID information for one or more incoming phone calls 104.

The system 100 includes a microphone 118, as known in the art, for use in recording user-recorded messages. The microphone 118 may be an ambient noise microphone. The microphone 118 receives sound waves, such as human voice or other audible sounds. The microphone 118 changes the sound waves into an electrical signal 120, referred to as a microphone output signal 120, that may be recorded, amplified, or transmitted, as known in the art. The microphone output signal 120, which is typically an analog signal, is received by an analog-to-digital converter 122, as known in the art, that converts the microphone output signal 120 to a digital signal, referred to as converter output signal, 124 that is relayed to the processor 112.

The processor 112 receives the converter output signal 124 and generates a storage signal 126 that contains the converter output signal 124. The processor 112 relays the storage signal 126 to a memory device 128, such as RAM (random access memory), SDRAM, or other types of readable and writable storage space, as known in the art. The memory device 128 may be part of or external to the processor 112. The memory device 128 stores the storage signal 126 as a user-recorded message. The memory 128 is able to relay the stored user-recorded messages back to the processor 112 upon request. In the preferred embodiment, the messages are digitally recorded messages.

When user-recorded messages are recalled from storage in memory 128 by the processor 112, it generates a speech output signal 130 based on the stored user-recorded messages, i.e., the storage signals 126 stored in memory 128. The processor 112 relays the speech output signal 130 to a speech synthesizer 132, as known in the art. An example of a speech synthesizer is disclosed in U.S. Pat. No. 5,903,628, issued on May 11, 1999, and titled "Caller Information (CLID) Controlled Automatic Answer Feature for Telephone" by Paul Michael Brennan. The speech synthesizer 132 converts the speech output signal 130 into an analog speech synthesizer signal 134 that is relayed to a speaker 136, as known in the art. An example of a speaker is disclosed in U.S. Pat. No. 6,072,859, issued on Jun. 6, 2000, and titled "Apparatus and Method of Generating Voice Message of Caller's Number in Case of Incoming Call in Telephone" by Tae-Ho Kong. The speaker 136 converts the analog signal 134 into audible sounds that are annunciated by the speaker 136. A volume control 138 adjusts the volume of the speaker output, and may be controlled by the user or the processor 112. The processor 112 may adjust the volume based on time of day or ambient noise levels, for example, through an ambient noise detector (not shown). Although the volume control 138 is shown as part of the speaker, the volume control may be located anywhere in the system 100.

When the processor 112 receives the ring detector output signal 106, the processor 112 may generate a mute signal 140. The mute signal 140 contains an instruction to mute a currently activated television, stereo, radio, or other device that may interfere with the called party hearing the incoming call indicator. The processor 112 relays the mute signal 140 to an infrared transmitter 142, as known in the art, such as an infrared transmitter found on remote controls and the like. Based on the instruction in the mute signal 140, the infrared transmitter 142 generates an infrared signal that is transmitted to a television or a radio that is currently activated. When the television or the radio receives the infrared signal, the device mutes its sound.

The system may also include other functions and features, such as basic telephone features, not described herein. For example, the system 100 may have a battery (not shown) that provides a back-up power supply to the system 100.

Figure 2A:
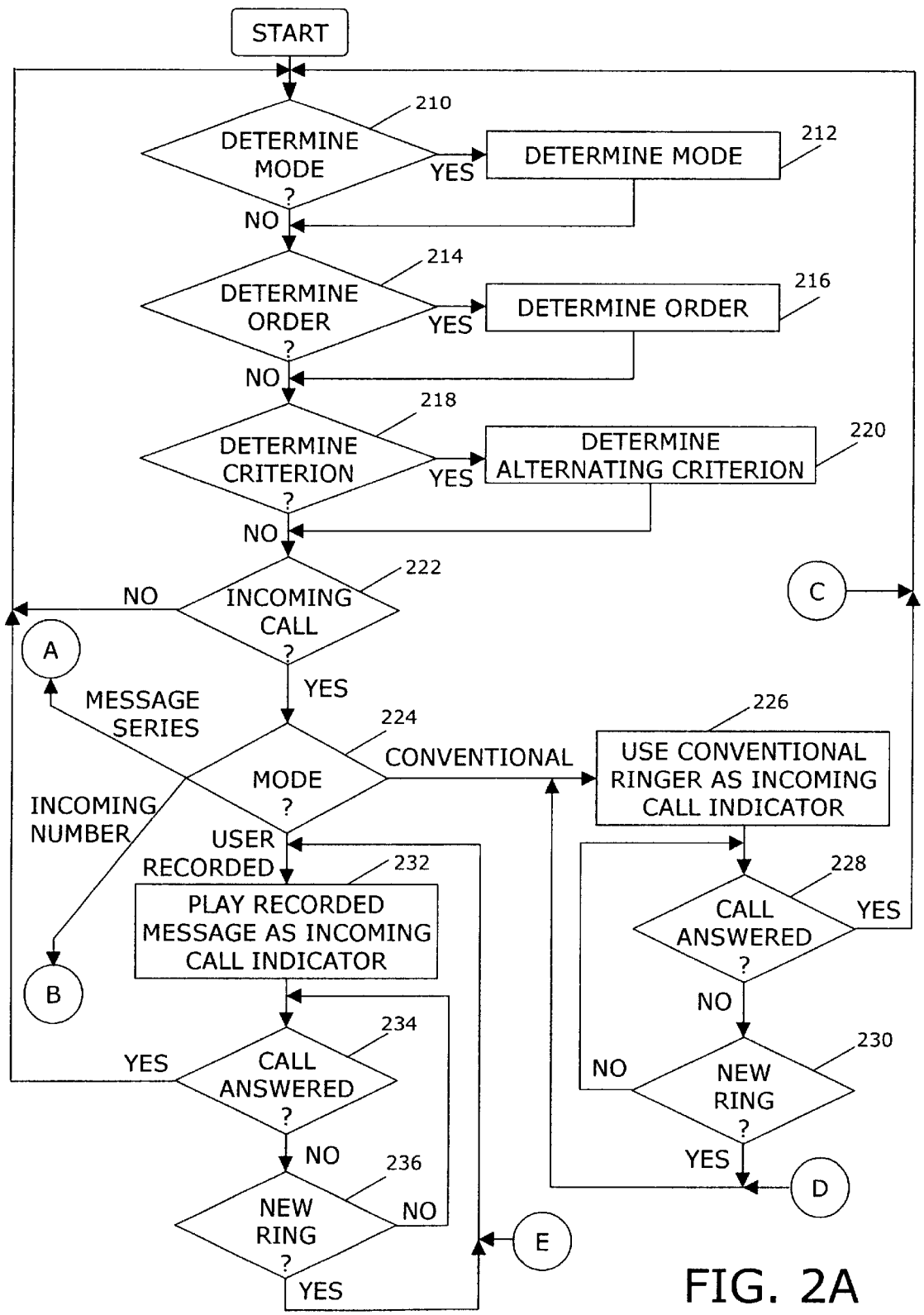
FIGS. 2A and 2B illustrate a flowchart showing provision of an incoming call indicator to a called party in accordance with the invention.
Figure 2B:
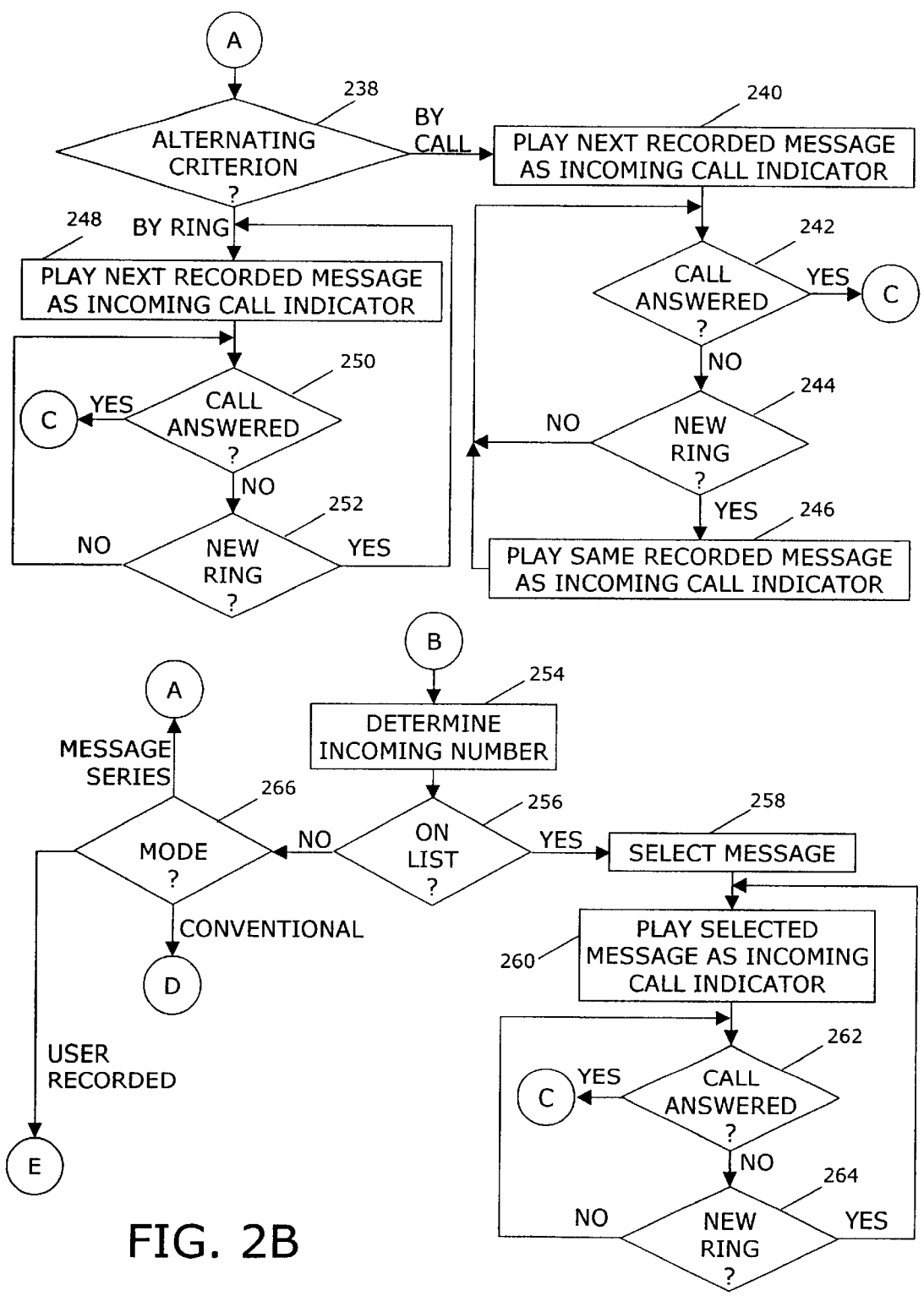
Figure 3:
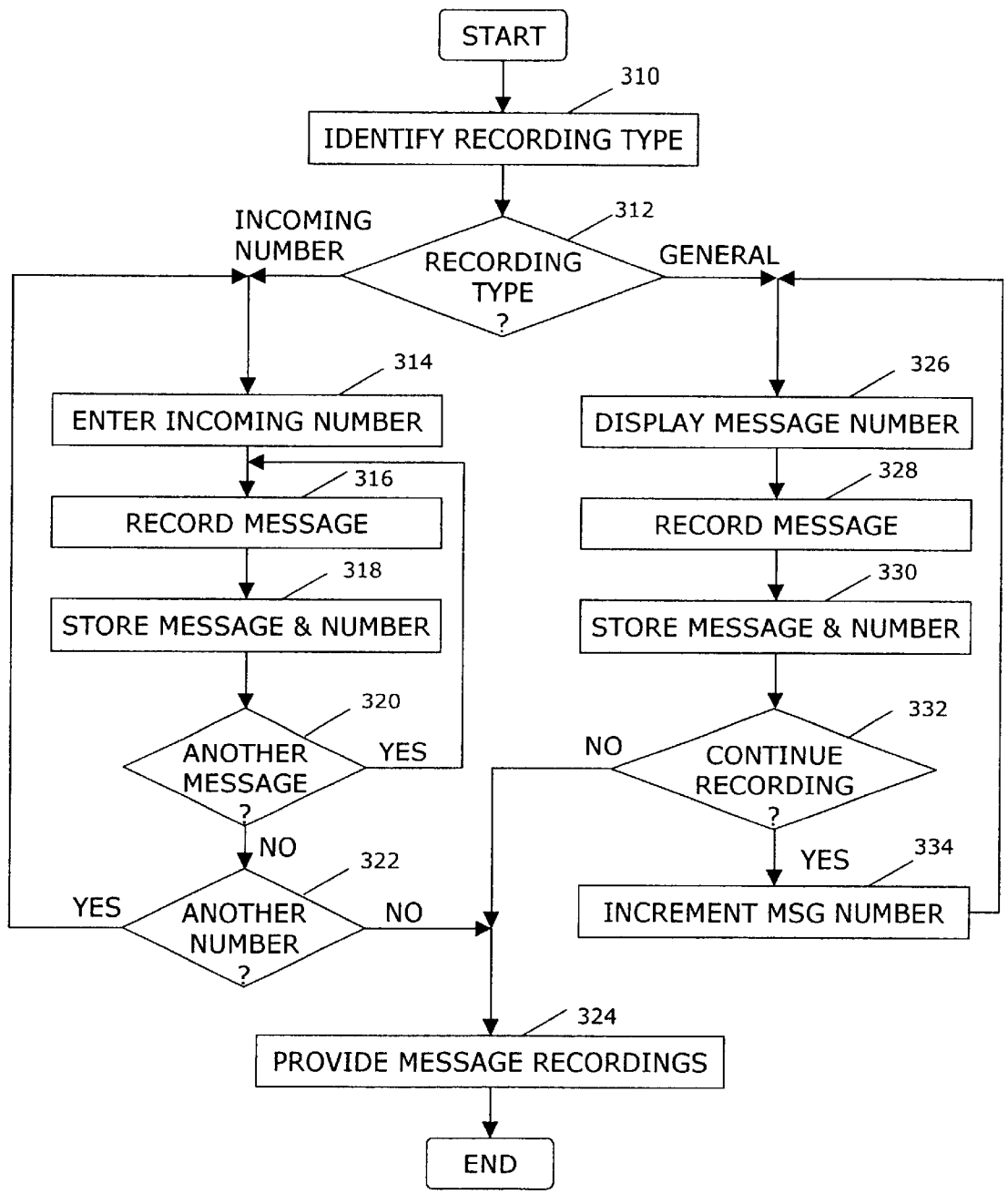
FIG. 3 is a flowchart of a process for recording and storing a recorded message in accordance with the invention.

The flowcharts of FIG. 2A, FIG. 2B, and FIG. 3 may be implemented as software stored in memory 128 and executed by the processor 112. The software language may be JAVA script, C, C++, or another software language that is capable of employing the system 100, as would be recognized by one of skill in the art.

Referring to FIGS. 2A and 2B, a flowchart illustrating an example of provision of an incoming call indicator to the called party. At step 210, the system 100 determines whether a user is selecting a mode for an incoming call indicator. When the system 100 determines that the user is selecting a mode, the process continues with step 212, where the user determines, inputs, or selects the mode for the incoming call indicator, for example, by entering the mode on a keypad (not shown), as known in the art, operating in conjunction with the processor 112. The system 100 may have a plurality of modes. The modes may include alternating playing one of a series of user-recorded messages to the called party, utilizing a conventional ringing sound as an incoming call indicator, playing a user-recorded message as the incoming call indicator, and associating a user-recorded caller-specific message with one or more incoming phone numbers, and, when the call is from one of the incoming phone numbers, playing at least one of the user-recorded messages as the incoming call indicator to the called party. After the user selects a mode at step 212, the process continues with step 214.

When the user does not select a mode at step 210, the process continues with step 214, where the system 100 determines whether the user is selecting an order by which user-recorded messages are to be played to the called party. When the system detects that the user is selecting an order of user-recorded messages, at step 216, the user determines and enters the order in which the user-recorded messages are to be played to the called party. The order may include the order of user-recorded messages played on an automatically alternated basis, for example, on a random basis or according to a predetermined order that the user may enter at step 216. The predetermined order may include, for example ordering messages labeled as 1 through 10 in a different order such as 1, 3, 5, 7, 9, 2, 4, 6, 8, and 10. Entry of the order may be made via keypad, as known in the art. After the user selects one or more orders at step 216, the process continues with step 218.

At step 218, the system 100 determines whether the user is selecting an alternating criterion for the user-recorded messages. When the user is selecting the alternating criterion for the user-recorded messages, at step 220, the user determines and enters the alternating criterion for playing the user-recorded messages. The alternating criterion may be to alternate the user-recorded messages when a new ring signal is detected at the ring detector 102 or may be to alternate the user-recorded messages when a new incoming phone call is detected at the ring detector 102. In other words, the user may select whether the incoming call indicator message changes each time the phone rings or changes each time a new call is received. Entry of the alternating criterion may be made via keypad, as known in the art. After the user selects the alternating criterion at step 220, the process continues with step 222.

At step 222, the system 100 determines whether an incoming phone call 104 is received. Detection of an incoming call may be determined, for example, by the processor 112 determining whether it has received a ring detector output signal from the ring detector 201 or alternatively when the ring detector 102 receives a ring signal. When the system 100 does not receive an incoming phone call 104 at step 222, the process continues with step 210.

When the system 100 receives an incoming phone call 104 at step 222, the process continues with step 224, where the system 100 determines the currently selected incoming call indicator mode.

When, at step 224, the selected incoming call indicator mode is conventional ringing, the process continues with step 226, where the system 100 generates a conventional ringing sound as the incoming call indicator. At step 228, the system 100 determines whether the incoming phone call 104 has stopped coming in or has been answered, for example, by receiving an off-hook signal from the ring detector 102. If the incoming phone call 104 is answered or ended, the process continues with step 210. If the incoming phone call 104 is not answered, the process continues with step 230. The system determines whether another ring signal of the incoming phone call 104 is received at step 230. If another ring signal has not been received, the process continues with step 228. When another ring signal has been received, the process continues with step 226.

When, at step 224, the system 100 determines that the selected mode is to provide a user-recorded message, the process continues with step 232, where the system retrieves the user-recorded message from memory 128. The processor 112 relays the user-recorded message via the speech synthesizer 132 to the speaker 136, as described above, thereby playing the user-recorded message to the called party as the incoming call indicator. At step 234, the system 100 determines whether the incoming phone call 104 has stopped coming in or has been answered. If the incoming phone call 104 is answered or ended, the process continues with step 210. If the incoming phone call 104 is not answered, the process continues with step 236. The system determines whether another ring signal of the incoming phone call 104 is received at step 236. If another ring signal has not been received, the process continues with step 234. When another ring signal has been received, the process continues with step 232.

When, at step 224, the system 100 determines that the selected mode is the provision of a series of user-recorded messages, the process continues with step 238 of FIG. 2B, where the system 100 determines which alternating criterion is selected. When the alternating criterion is by call, the process continues with step 240, where the system 100 retrieves the next user-recorded message that is stored in memory 128 and plays it as the incoming call indicator as described above. At step 242, the system 100 determines whether the incoming phone call 104 has stopped coming in or has been answered. If the incoming phone call 104 is answered or ended, the process continues with step 210 of FIG. 2A. If the incoming phone call 104 is not answered, the process continues with step 244. The system determines whether another ring signal of the incoming phone call 104 is received at step 244. If another ring signal has not been received, the process continues with step 242. When another ring signal has been received, the process continues with step 246, where the same recorded message from step 240 is played as the incoming call indicator, and the process continues with step 242.

When, at step 238, the alternating criterion is by ring, the process continues with step 248, where the system 100 plays the next user-recorded message from memory 128 as the incoming call indicator. At step 250, the system 100 determines whether the incoming phone call 104 has stopped coming in or has been answered. If the incoming phone call 104 is answered or ended, the process continues with step 210. If the incoming phone call 104 is not answered, the process continues with step 252. The system determines whether another ring signal of the incoming phone call 104 is received at step 252. If another ring signal has not been received, the process continues with step 250. When another ring signal has been received, the process continues with step 248.

When, at step 224, the selected mode is to associate one or more user-recorded caller-specific messages with the incoming phone number, the process continues with step 254 of FIG. 2B, where the system 100 determines the incoming phone number. At step 256, the system 100 determines whether the incoming phone number is stored in a list of incoming numbers in memory 128.

If the incoming phone number is stored in memory 128, the process continues with step 258, where the system 100 selects (in case there is more than one message stored for an incoming number) and retrieves from memory 128 a user-recorded message that is associated with the incoming phone number. At step 260, the system 100 plays the user-recorded message that is associated with the incoming phone number as the incoming call indicator. At step 262, the system 100 determines whether the incoming phone call 104 has stopped coming in or has been answered. If the incoming phone call 104 is answered or ended, the process continues with step 210. If the incoming phone call 104 is not answered, the process continues with step 264. The system determines whether another ring signal of the incoming phone call 104 is received at step 264. If another ring signal has not been received, the process continues with step 262. When another ring signal has been received, the process continues with step 260.

When at step 256, the incoming phone number is not stored in memory 128, the process continues with step 266, where the system 100 determines an alternate mode of incoming call indicator for use with the incoming call. When the alternate mode is conventional ringing sound, the process continues with step 226 of FIG. 2A. When the alternate mode is to play a user-recorded message, the process continues with step 232 of FIG. 2A. When the alternate mode is to provide a series of user-recorded messages, the process continues with step 238.

An optional alternate mode at step 266 (not shown), is utilized when the caller ID detector 108 detects an undesirable incoming number for the incoming phone call 104. Undesirable numbers may include specific numbers, 800 numbers, 900 numbers, blocked numbers, and/or unknown or unavailable numbers. The caller ID detector 108 generates a caller ID detector output signal 110 with a command instructing the processor 112 not to allow the ring signal of the incoming phone call 104 to produce an audible incoming call indicator to the called party. In this embodiment, the processor 112 relays a recorded message back to the calling party, as known in the art. For example, the recorded message back to the calling party may be "The number you have reached does not accept calls from solicitors. Please remove this number from your calling list."

The flowchart of FIG. 3 illustrates an example of a method for recording and storing messages for use as incoming call indicators. At step 310, the user determines a recording type that indicates when the user-recorded message is to be played. The recording may be associated with an incoming phone number or may generally be played in a manner not associated with an incoming phone number.

If at step 312 the recording type is based on the incoming phone number, the process continues with step 314, where the user enters the incoming phone number via a keypad (not shown), as known in the art, for storage in memory 128 via the processor 112. At step 316, a message to be associated with the incoming number entered at step 314 is recorded, as described above, and stored in memory 128 at step 318 with the incoming phone number. Optionally, a password may be entered by the user to prevent accidental or intentional erasure or change of the recorded message. The password would be stored with the message and incoming number.

If at step 320, the user elects to record another message for the incoming number entered at step 314, the process continues with step 316. If the user elects at step 320 not enter another recorded message for the same incoming phone number, the process continues with step 322, where the user elects whether to enter another incoming phone number and record a message for that number. If the user elects to enter another incoming phone number, the process continues with step 314. If the user elects at step 322 not to enter another incoming phone number, the process continues with step 324, where the recorded messages are able to be provided as incoming call indicators.

If at step 312, the user elects to enter a general recorded message, the process continues with step 326, where the system 100 displays a number, letter, or other identifier for the message to be recorded. At step 328, the user records a message. At step 330, the system 100 relays the recorded message and the number, letter, or other identifier for the recorded message to memory 128 for storage. If the user elects to record another recorded message at step 332, at step 334 the system 100 increments the number, letter, or other identifier of the recorded message, and the process continues with step 326. If the user elects not to record another recorded message at step 332, the process continues with step 324.

The present invention provides a flexible method of providing various different incoming call indicators and modes of indicators to a called party. The incoming call indicator may be (a) a single message; (b) one or more messages associated with an incoming call number; (c) a series of user-recorded messages played on an alternating basis, either by ring or by call; and (d) a conventional ringing. Provision is made for recording of message(s) by the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   providing at least two recorded messages;
   based on an alternating criterion, automatically alternating playing the at least two recorded messages as an incoming call indicator to a called party when an incoming call is received by a phone;
   wherein the alternating criterion comprises an occurrence of a subsequent ring of a same phone call.

2. The method of claim 1, wherein the alternating criterion comprises receiving a new phone call.

3. The method of claim 1, wherein the alternating criterion comprises determination of an incoming phone number.

4. The method of claim 1, wherein the at least two recorded messages are alternated randomly.

5. The method of claim 1, wherein the at least two recorded messages are alternated according to a predetermined order.

6. The method of claim 5, wherein the predetermined order is user selectable.

7. The method of claim 1, further comprising the step of providing recording capability for the at least two recorded messages.

8. The method of claim 1, wherein the at least two recorded messages comprise digitally recorded messages.

9. The method of claim 1, further comprising the steps of:
   associating a predetermined message with one or more incoming phone numbers, wherein the predetermined message is recorded by a user;
   when a call is received from one of the one or more incoming phone numbers, substituting the automatically alternating playing step with playing the predetermined message associated with the one of the incoming phone numbers as an incoming call indicator to a called party.

10. A method comprising:
    storing one or more incoming phone numbers;
    associating a predetermined message with each of the one or more incoming phone numbers, wherein the predetermined message is recorded by a user;
    when a call is received from one of the one or more incoming phone numbers, playing the predetermined message associated with the one of the incoming phone numbers as an incoming call indicator to a called party;
    when a call is received from a number that is not one of the one or more incoming phone numbers, alternating playing one of a series of user-recorded messages as an incoming call indicator to a called party.

11. The method of claim 10, wherein each incoming phone number is associated with one predetermined message tailored to the incoming phone number.

12. The method of claim 10, further comprising the step of storing the one or more incoming phone numbers on a phone that receives the call.

13. The method of claim 10, further comprising the step of, when a call is received from a number that is not one of the one or more incoming phone numbers, utilizing a conventional ringing sound as an incoming call indicator to a called party.

14. The method of claim 10, further comprising the step of, when a call is received from a number that is not one of the one or more incoming phone numbers, playing a user-recorded message as an incoming call indicator to a called party.

15. The method of claim 10, further comprising the step of, when a call is received from a number that is not one of the one or more incoming phone numbers, alternating playing one of the series of user-recorded messages as the incoming call indicator to the called party on each subsequent ring of a same phone call.

16. A method comprising:
    storing one or more incoming phone numbers;
    associating two or more predetermined messages with each of the one or more incoming phone numbers, wherein the one or more predetermined messages are recorded by a user;
    when a call is received from one of the one or more incoming phone numbers, playing at least one of the two or more predetermined messages associated with the one of the incoming phone numbers as an incoming call indicator to a called party;
    when a call is received from a number that is not one of the one or more incoming phone numbers, alternating playing one of a series of user-recorded messages as an incoming call indicator to a called party.

17. The method of claim 16, wherein each incoming phone number is associated with one predetermined message tailored to the incoming phone number.

18. The method of claim 16, further comprising the step of storing the one or more incoming phone numbers on a phone that receives the call.

19. The method of claim 16, further comprising the step of, when a call is received from a number that is not one of the one or more incoming phone numbers, utilizing a conventional ringing sound as an incoming call indicator to a called party.

20. The method of claim 16, further comprising the step of, when a call is received from a number that is not one of the one or more incoming phone numbers, playing a user-recorded message as an incoming call indicator to a called party.

21. The method of claim 16, further comprising the step of, when a call is received from a number that is not one of the one or more incoming phone numbers, alternating playing one of the series of user-recorded messages as the incoming call indicator to the called party on each subsequent ring of a same phone call.

22. A phone comprising at least three of the following modes of operation when a call is received by the phone:

A) utilizing a conventional ringing sound as an incoming call indicator to a called party;

B) playing a user-recorded message as the incoming call indicator to a called party;

C) alternating playing one of a series of user-recorded messages as the incoming call indicator to a called party independent of an incoming phone number;

D) associating at least two user-recorded caller-specific messages with one or more incoming phone numbers, and, when the call is from one of the one or more incoming phone numbers, alternating playing at least one of the at least two user-recorded messages as the incoming call indicator to a called party, wherein alternating comprises at least one of alternating on each subsequent ring of a same phone call and alternating on each subsequent phone call.

23. The phone of claim 22, wherein the phone operates in mode D when the call is from one of the one or more incoming phone numbers and operates in one of mode A, mode B, and mode C when the call is not from one of the one or more incoming phone numbers.

24. The phone of claim 22, wherein the series of user-recorded messages is alternated on a per-ring basis.

25. The phone of claim 22, wherein the series of user-recorded messages is alternated on a per-call basis.

26. A method comprising the steps of:

selecting, from a plurality of modes, a mode for an incoming call indicator for a phone, wherein one of the plurality of modes comprises alternating playing one of a series of user-recorded messages as the incoming call indicator to a called party, wherein alternating comprises at least one of alternating on each subsequent ring of a some phone call and alternating on each subsequent phone call;

when an incoming call is received, utilizing the selected mode for the incoming call indicator.

27. The method of claim 26, wherein one of the plurality of modes comprises utilizing a conventional ringing sound as an incoming call indicator to a called party.

28. The method of claim 26, wherein one of the plurality of modes comprises playing a user-recorded message as the incoming call indicator to a called party.

29. The method of claim 26, wherein one of the plurality of modes comprises associating at least one user-recorded caller-specific message with one or more incoming phone numbers, and, when the call is from one of the one or more incoming phone numbers, playing at least one of the at least one user-recorded message as the incoming call indicator to a called party.

30. The method of claim 26, wherein, when the call is not from one of the one or more incoming phone numbers, operating in a different mode.

31. The method of claim 26, wherein the series of user-recorded messages is alternated on a per-ring basis.

32. The method of claim 26, wherein the series of user-recorded messages is alternated on a per-call basis.

* * * * *

UNITED STATES PATENT AND TRADEMARK OFFICE
CERTIFICATE OF CORRECTION

PATENT NO. : 6,697,470 B2
DATED : February 24, 2004
INVENTOR(S) : Steven D. McDonough It is certified that error appears in the above-identified patent and that said Letters Patent is hereby corrected as shown below:

Column 10,
Line 10, replace "some" with -- same --.

Signed and Sealed this

Twenty-fifth Day of May, 2004

JON W. DUDAS
*Acting Director of the United States Patent and Trademark Office*